United States Patent  [15] 3,662,597
DeGhetto  [45] May 16, 1972

[54] TIRE TESTING MACHINE

[72] Inventor: Anselm DeGhetto, Clifton, N.J.
[73] Assignee: Getty Machine and Mold, Inc., Clifton, N.J.
[22] Filed: June 25, 1970
[21] Appl. No.: 49,610

[52] U.S. Cl. ............................................................. 73/146
[51] Int. Cl. ........................................................... G01m 17/05
[58] Field of Search ........................................ 73/146, 78, 8

[56] References Cited

UNITED STATES PATENTS 2,695,520  11/1954  Karsai ....................................... 73/146
3,375,714   4/1968  Bottasso ................................... 73/146

Primary Examiner—Donald O. Woodiel
Attorney—Oberlin, Maky, Donnelly & Renner

[57] ABSTRACT

A tire testing machine capable of performing both a tire bead unseating test and a strength test in which a hydraulic piston cylinder assembly for exerting pressure against a tire is pivotally mounted for swinging movement during the unseating test and is held in a fixed position during the tire strength test. The tire supporting assembly is adjustably mounted for horizontal positioning of the tire below the piston cylinder assembly and one end of a horizontal guide arm is pivotally connected to the piston cylinder assembly for the bead unseating test. The horizontal position of the arm is adjustable with the piston cylinder assembly and different size tires may be tested by adjustments to the length of the guide arm and the position of the arm pivot. Control and recordation of the pressure exerted on the tires, the distance the pressure applying member moves and the position and pressure at which failure occurs is also provided.

9 Claims, 6 Drawing Figures

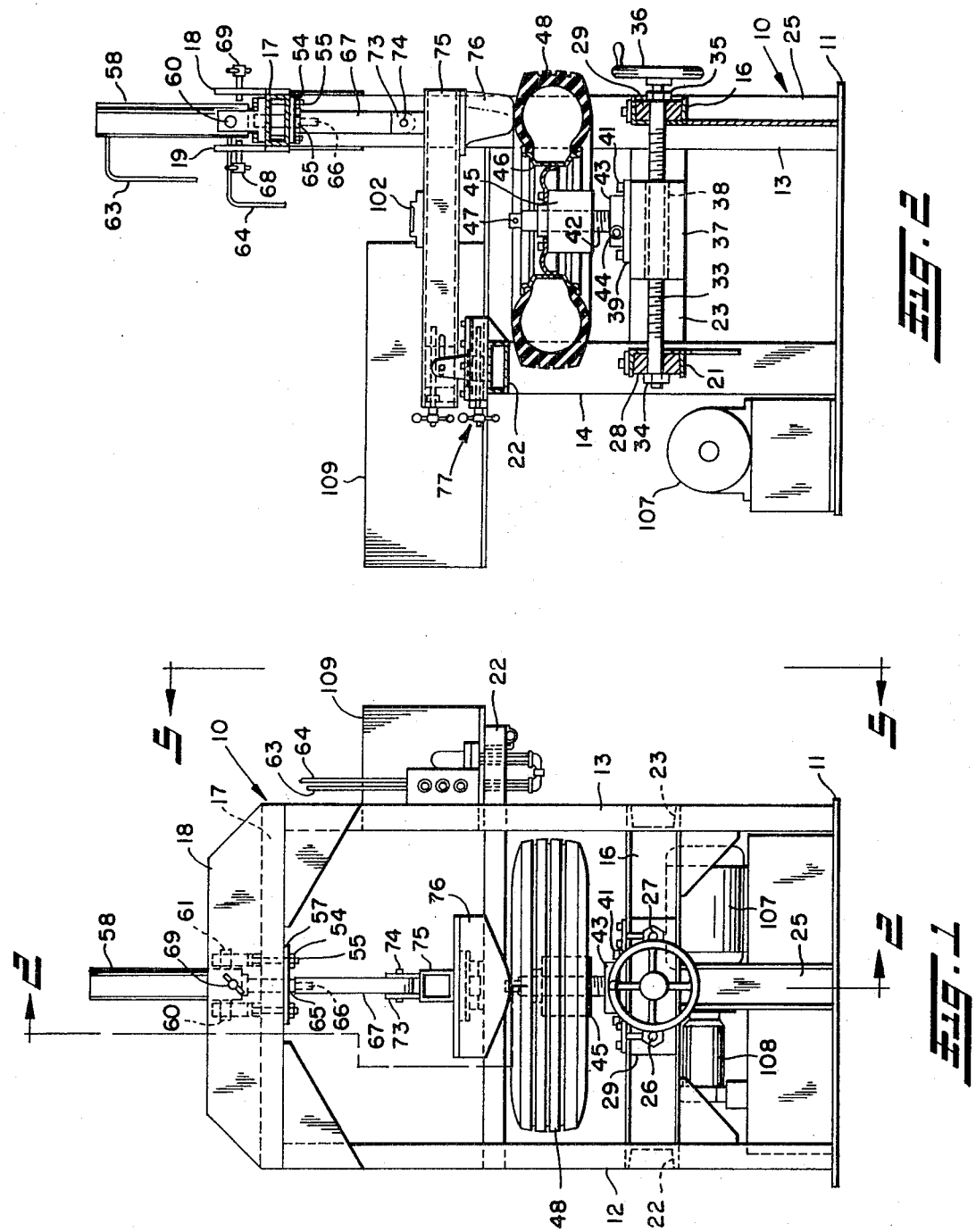

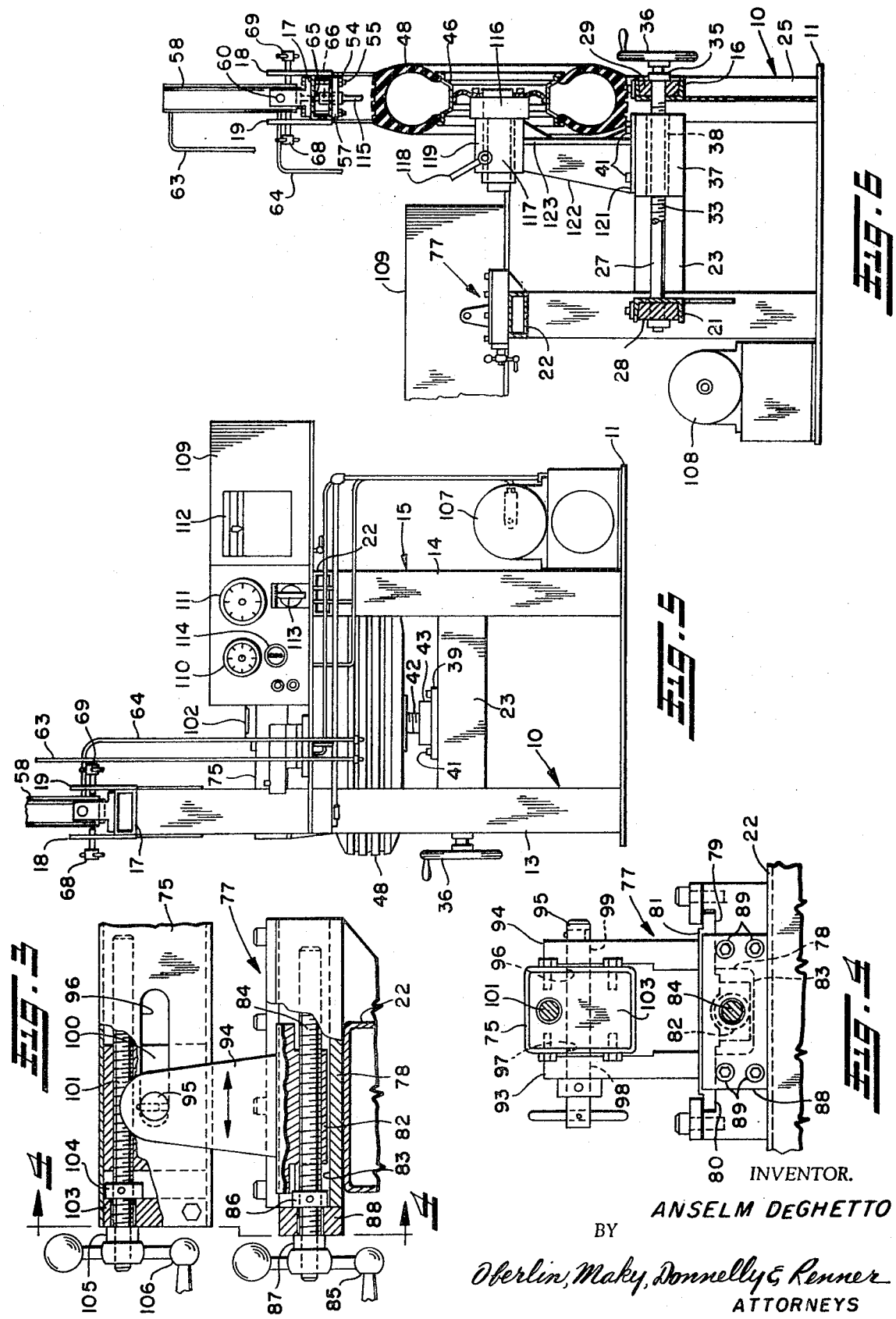

TIRE TESTING MACHINE

Safety standards for pneumatic tires have been set up by the Department of Transportation of the United States Federal Highway Administration based on standards or practices using information from such organizations as the Society of Automotive Engineers, Federal Trade Commission, Tire and Rim Association, and the Rubber Manufacturer's Association. The safety standards are based on tests which are set forth in Government Rules and Regulations. Two of the tests provide for mounting tires on rims in the inflated condition and exerting a specified pressure at a specified position on the tire with the pressure applying member moving into the tire at a specified rate. Heretofore, separate testing machines have been used for performing these two tests. Furthermore, different machines have been used for testing different size tires and this has a resulted in each testing facility having two or more separate testing machines for performing these two tests.

Testing machines are necessarily built with greater precision and resistance to distortion than is other machinery because the validity of the tests depends upon the conditions imposed on the tested article by the testing machine. This is true with the two tests referred to above in which pressures on the order of several thousand pounds per square inch are imposed on tires and accordingly the tire machine will be subjected to substantially high stresses. These conditions make the separate testing machines used heretofore costly and therefore there is a definite need for a testing machine which will perform both tests on more than one size tire to reduce the number of machines necessary and thereby reduce the investment in laboratory machinery as well as reduce the space required for testing tires.

It is, therefore, a principal object of this invention to provide a tire testing machine for performing more than one type of test.

Another object of this invention is to provide a tire testing machine which will test more than one size of tire.

A further object of this invention is to provide adjustable means for setting the tire in the proper position to be tested.

A still further object of this invention is to provide for guiding the pressure applying member as it is applied to the surface of the tire.

These and other objects of the present invention may be achieved by using the testing machine construction which is adaptable for performing a tire bead unseating test and also a plunger strength test.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

In the a annexed drawings:

FIG. 1 is a front elevation of the testing machine with the tire in position for conducting a bead unseating test.

FIG. 2 is a sectional view taken along the planes of line 2—2 of FIG. 1.

FIG. 3 is an enlarged fragmentary elevation of the arm length adjustment and the pivot position adjustment shown in FIG. 2, parts being broken away.

FIG. 4 is a section taken along the plane of line 4—4 of FIG. 3.

FIG. 5 is a side elevation of the testing machine shown in FIG. 1 illustrating the control and recording equipment used therewith.

FIG. 6 is a sectional view like FIG. 2 of the testing machine with the tire in position for conducting a strength test with a plunger.

Referring to FIG. 1, a testing machine frame 10 is shown which may be of a welded steel construction mounted on a base plate 11. Two front corner posts 12 and 13 are mounted on the base plate 11 at the front of the machine and two rear corner posts 14 and 15 are mounted on the base plate 11 at the rear of the machine. The two front corner posts 12 and 13 are connected by a lower front horizontal beam 16 and an upper front horizontal beam 17. The upper front horizontal beam 17 is reinforced by side plates 18 and 19 mounted on the upper beam at the front and rear and extending upwardly therefrom. The rear corner posts 14 and 15 are connected by a lower rear horizontal beam 21 and an upper rear horizontal beam 22. Horizontal side beams 23 and 24 connect the front corner posts 12 and 13 with the rear corner posts 14 and 15. An upright reinforcing channel member 25 is mounted on the base plate 11 and extends upwardly to the lower front horizontal beam 16 to provide additional support.

Slide rods 26 and 27 extend from the lower front horizontal beam 16 to the lower rear horizontal beam 21 in parallel relationship. A rear reinforcing plate 28 is fastened to the lower rear horizontal beam 21 for receiving the rear ends of slide rods 26 and 27 and a front reinforcing plate 29 is fastened to the lower front horizontal beam 16 for receiving the front ends of the slide rods. Spaced between the slide rods 26 and 27 is an adjusting drive screw 33 having thrust resisting members such as a nut 34 at the rear reinforcing plate 28 and a collar 35 at the front reinforcing plate 29. A control wheel 36 is mounted on the front end of the drive screw 33.

A tire mounting block 37 has holes through which the slide rods 26 and 27 pass and support the block in slidable engagement. The drive screw 33 also extends through the mounting block 37 and engages a threaded sleeve 38 in the block for movement of the block to the front or the rear on the slide rods 26 and 27. A tire holder plate 39 may be fastened to the mounting block 37 as by bolts 41 extending through the tire holding plate into the mounting block. A tire holding shaft 42 extends upwardly from the tire holding plate 39 where it is supported in a swivel connection 43 having a locking bolt 44. The shaft 42 is threaded at the upper end to receive a nut adapter 45 on which a tire rim 46 may be mounted. A hole 47 through the upper end of the shaft 42 is adaptable to receive a bar (not shown) for turning the shaft 42 in the swivel connection 43 so that a tire 48 mounted on the rim 46 may be moved to different circumferential positions.

At the center portion of the upper front horizontal beam 17, pillow blocks 52 and 53 are bolted on the beam by nuts 54 and bolts 55 which extend through the pillow blocks, through the upper front horizontal beam 17 and through a reinforcing plate 57 at the lower face of the beam. A cylinder 58 of a hydraulic piston cylinder assembly extends upwardly between the pillow blocks 52 and 53 and has trunnions 59 and 60 extending outwardly into the bores 61 and 62 of the pillow blocks. Hydraulic lines 63 and 64 are connected to the cylinder 58 for actuation of a piston connected to a piston rod 65 extending downwardly from the cylinder and having an adapter 66 for engagement with a pressure applying member such as connecting link 67. Pivotal swinging movement of the cylinder 58 on the trunnions 59 and 60 in pillow blocks 52 and 53 may be permitted or restricted by knob screws 68 and 69 extending through and in threaded engagement with the side plates 18 and 19 of the front upper horizontal beam 17. The lower end of connecting link 67 fits in a clevis 73 and is pivotally connected thereto by a pin 74 extending through the end of the link and the clevis. The clevis 73 is mounted on the forward end of a guide arm 75 which extends in a generally horizontal direction from the front of the machine to the rear where the rear end of the guide arm is pivotally connected to the upper rear horizontal beam 22. A special crescent-shaped tire unseating block or shoe 76 is mounted on the underside of the guide arm 75 for applying pressure to the sidewall of the tire 48 during the bead unseating test.

For different size tires the effective length of the guide arm 75 must be adjusted. Also the position of the pivot point around which the guide arm swings must be adjusted to maintain the shoe 76 in position to engage the tire 48. Referring to FIGS. 3 and 4, the guide arm pivot and length adjusting assembly 77 is shown in greater detail. A slide block 78 is fastened to the upper rear horizontal beam 22 at a center portion thereof as by welding. The slide block 78 has parallel ways 79 and 80 extending in a fore and aft direction for receiving a pivot pin bracket member 81 in slidable engagement therewith. Extending downwardly from the bracket 81 is a threaded lug 82 which is movable in the fore and aft direction in a channel 83 of the slide block 78. An adjusting screw 84 is mounted in the slide block 78 for rotation by a crank handle 85 threaded on the rear end. Axial movement of the adjusting screw 84 is prevented by a collar 86 fastened to the screw and a washer 87 held against the crank handle 85. A face plate 88 is interposed between the collar 86 and washer 87 and fastened to the slide block 78 as by screws 89. The bracket 81 has upwardly extending lugs 93 and 94 between which the guide arm 75 is interposed. A removable pivot pin 95 passes through the slots 96 and 97 in the walls of the guide arm 75 and through holes 98 and 99 in the lugs 93 and 94.

The guide arm 75 has a slidable pivot block 100 inserted therein with a hole through which the pivot pin 95 may pass. The pivot block 100 also is threaded longitudinally of the guide arm 75 for receiving an adjusting screw 101 in threaded engagement. The adjusting screw 101 extends rearwardly out through the end of the guide arm 75 and through a plug member 103 in the end of the arm. A collar 104 fastened to the adjusting screw 101 and abutting the inner face of the plug member 103 prevents relative axial movement of the screw towards the rear of the guide arm 75 and a washer 105 held against the rear face of the plug member by a crank handle 106 in threaded engagement with the screw prevents movement of the screw in the forward direction.

With this adjusting assembly 77, adjustments can be made to increase or decrease the effective length of the guide arm 75 by turning crank handle 106 which turns adjusting screw 101 causing the pivot block 100 to move in the guide arm and change the effective length of the arm from the tire engaging shoe 76 to the pivot pin 95. The compensate for this change in length and still maintain the shoe 76 under the cylinder 58, the bracket 81 may be adjusted in the fore and aft direction as shown by the arrows in FIG. 3 by turning the crank handle 85 and thereby turn the adjusting screw 84 to move the bracket 81 along the ways 79 and 80 of the slide block 78.

As shown in FIG. 5, the hydraulic lines 63 and 64 are connected through pressure control and recording apparatus to a source of hydraulic pressure which may be a motor and pump 107 and 108. A control panel 109 for the testing machine contains a pressure gauge 110 to indicate the pressure in pounds per square inch and a total force gauge 111 to indicate the total force or the piston area times the pounds per square inch. This force is relayed to a recorder 112 by a transducer. The recorder chart travels at a predetermined rate which is related to the travel of the piston rod 65. A flow regulator 113 controls the rate at which the piston in cylinder 58 will move. A pressure regulator 114 may be used to regulate the pressure shown in the pressure gauge 110.

With reference to FIG. 6, a plunger 115 is mounted on the piston rod adapter 66 for engagement with the tire 48 mounted in a vertical position on rim 46 which is fastened to a hub 116 in a horizontal swivel joint 117 with a lock bolt 118 to hold the rim in a set position. The swivel joint 117 is carried in a cylindrical support 119 mounted on tire holding plate 121 by bracket members 122 and 123. This tire holding plate 121 may be fastened securely to the mounting block 37 by bolts 41.

In operation, the tire testing machine is shown in condition to perform a bead unseating test in FIGS. 1, 2, 3, 4 and 5 to determine the resistance of a tubeless tire to bead unseating forces. The same machine is shown in the condition for conducting a tire strength test in FIG. 6. To conduct the unseating test, the tire 48 is mounted on the rim 46 and inflated, after which the rim 46 is bolted on the nut adapter 45. The length of the guide arm 75 is then adjusted if necessary so that the effective length from the shoe 76 to the fulcrum point at pivot pin 95 is in proper relation to the tire size. This adjustment is accomplished by turning the screw 101 with crank handle 106 to provide the proper length. The position of the shoe 76 over the tire 48 is then adjusted by turning screw 84 with crank handle 85 to move the bracket 81 towards or away from the tire in the direction shown by the arrows in FIG. 3.

Setting of the guide arm 75 in a horizontal position is facilitated by the level 102 on the guide arm and a level condition is obtained by operating the hydraulic system and moving the piston rod 65 upward or downward in the cylinder 58 until a level position is obtained. The tire 48 and rim 46 are then rotated manually which rotates the nut adapter 45 on the tire holding shaft 42 until the tire is even or touches the unseating block or shoe 76. The pressure regulator 114 is then opened and the pressure directed to the upper part of cylinder 58 so that the shoe 76 will be pressed down against the tire 48. The pressure regulator 114 is then turned to obtain the specified pressure in the pressure gauge 110. Similar tests at other points around the tire 48 are obtained by loosening the locking bolt 44 and turning the tire holding shaft 42 by inserting a bar through the hole 47 in the shaft and turning the bar after which the locking bolt 44 is again tightened to hold the tire in position.

In conducting the strength test with the plunger 56, the guide arm 75 and connecting link 67 are removed from the adapter 66 and replaced with the plunger 115. Also the knob screws 69 are screwed into engagement with the cylinder 58 to hold it in a fixed vertical position. The tire holding plate 39 is unscrewed from the mounting block 37 by removing bolts 41 and replaced with the tire holding plate 124 which has the hub 116 for holding a tire in a vertical position. The tire 48 is inflated on the rim 46 and mounted on the hub 116. The tire 48 is then aligned in the proper position under the plunger 115 by turning the control wheel 36 to move the mounting block 37. The tire 48 is locked in position by turning the lock bolt 118.

To test the tire 48, hydraulic fluid under pressure is introduced into the upper part of cylinder 58 forcing the plunger 115 down into contact with the tread of the tire 48 and as the plunger descends into the tire the pressure in pounds per squre inch is indicated by the pressure gauge 110. The total force in pounds is indicated by the gauge 111 and this force is signaled to the recorder 112 by a transducer or other means. The recorder chart travels at a set rate which may be two inches per minute and the plunger 115 is regulated to travel at the same speed by regulating the flow regulator 113. If the tire 48 breaks, the recorder graph plots both the force at which the brake occurs and the distance the plunger 115 entered the tire. This is desired to compute the breaking energy. If the tire 48 does not fail and the plunger 115 travels downward until it strikes the rim 46, a pressure switch (not shown) is in the circuit to break the circuit at a predetermined pressure regulated by the pressure regulator 114 to neutralize the controls permitting the operator to compare the gauges and the graph on the recorder. This same test may be performed at different positions around the periphery of the tire by releasing the locking bolt 118 and turning the tire to the desired position after which the tire may be locked by tightening the bolt.

It can be seen that with this testing machine, both the bead unseating and plunger strength test can be performed quickly and accurately on more than one size of tire.

While certain representative embodiments and details have been shown for the purpose of illustrating the invention, it will be apparent to those skilled in the art that various changes and modifications may be made therein without departing from the spirit or scope of the invention.

I, therefore, particularly point out and distinctly claim as my invention:

1. A tire testing machine for performing more than one type of test comprising a machine frame, a pressure applying means pivotally mounted on said frame for swinging movement about an axis, said pressure applying means including a rod member movable toward a tire to apply pressure, mounting means attached to said machine frame spaced from said pressure applying means for supporting a tire holder, movement controlling means removably mounted between said mounting means and said rod member, means for locking said pressure applying means in a predetermined position on said frame with said movement controlling means removed and a tire holder on said mounting means supporting a tire for engagement by said rod member for applying pressure to the crown of the tire to perform a first type of test, means for pivotally connecting said rod member and said movement controlling means with said pressure applying means in the swingable condition and a tire holder on said mounting means at a position spaced from said movement controlling means supporting a tire for application of pressure to the sidewall of the tire to perform a second type of test and means for measuring the pressure exerted and distance moved in said pressure applying means.

2. A tire testing machine according to claim 1 wherein said pressure applying means includes a piston cylinder assembly with the cylinder of said assembly pivotally mounted on said frame and said rod member connected to said piston.

3. A tire testing machine according to claim 2 wherein said movement controlling means includes a guide arm in a generally horizontal position having a pivotal connection to said rod member at one end and a pivotal connection to said frame at the other end.

4. A tire testing machine according to claim 3 wherein said guide arm includes means for changing the length of said arm and said pivotal connection to said frame includes an adjustment for moving the pivotal connection relative to said frame whereby tires of different sizes may be tested.

5. A tire testing machine according to claim 3 wherein said piston cylinder assembly may be extended or contracted to set said arm in a level position prior to testing.

6. A tire testing machine according to claim 1 wherein said mounting means is slidably mounted on said machine frame for adjusting movement of the tire holder relative to said pressure applying means in one direction.

7. A tire testing machine according to claim 6 wherein said mounting means includes screw means for adjusting and maintaining the position of the tire holder relative to said pressure applying means.

8. A tire testing machine according to claim 7 wherein said mounting means includes a second screw means with a nut adapter threaded on said second screw and supporting a tire rim for adjusting the position of said tire relative to said pressure applying means in a second direction.

9. A tire testing machine according to claim 6 wherein said mounting means includes a swivel connection rotatable about the axis of a test tire and lock means to fix the position of the test tire around its axis for application of pressure by said rod member at different positions around the tire.

* * * * *